3,274,178
METHOD FOR PREPARING 16α-HYDROXYPREG-NENES AND INTERMEDIATES OBTAINED THEREIN

Percy L. Julian, Oak Park, and Arthur Magnani, Wilmette, Ill., assignors to Smith Kline & French Laboratories, Philadelphia, Pa., a corporation of Pennsylvania
No Drawing. Filed May 28, 1964, Ser. No. 371,106
7 Claims. (Cl. 260—239.55)

This invention relates to a new method for preparing 16α-hydroxypregnenes which have utility as intermediates for preparing useful 16-hydroxy corticoid products, such as triamcinolone, triamcinolone acetonide, etc.

More specifically, this invention is described by the following overall reactions:

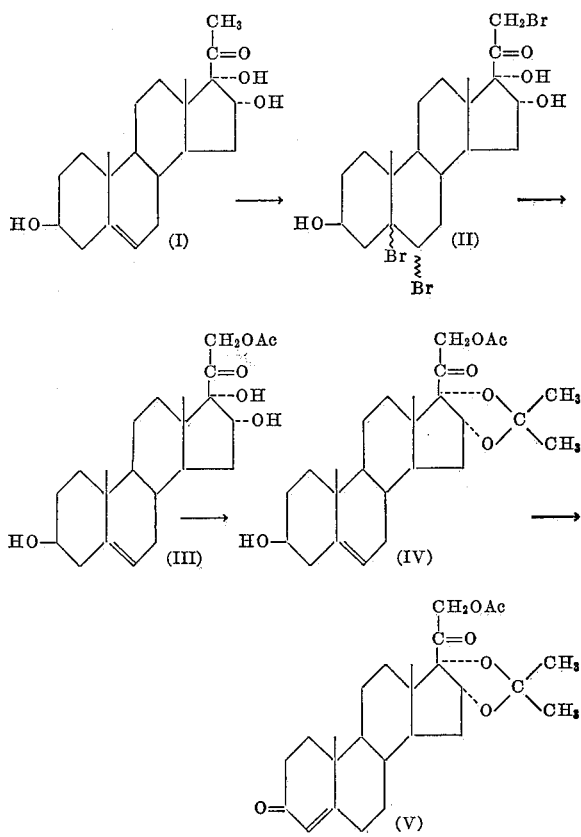

5-pregnene-3β,16α,17α-triol-20-one (I, Ellis et al., J. Chem. Soc., (1961), 4111) is tribrominated to form 5,6,21 - tribromopregnane - 3β,17α,17α - triol - 20 - one (II). This bromination is carried out by reaction of the pregnenolone with about one molar equivalent of bromine in a suitable solvent usually methylene chloride-pyridine to form the 5,6-dibromo compound. The second mole of bromine is then added along with a hydrohalide such as hydrogen chloride gas often with methanol to initiate bromination at C-21. A weak base such as an alkali metal carbonate, lower carboxylate or preferably bicarbonate may be added to the methylene chloride-methanol reaction mixture to separate the desired tribromide which is essentially the 5α,6β,21-tribromo compound. This new bromo intermediate is also a part of this invention.

The reaction can alternatively be carried out advantageously in two steps. The triolone can be reacted with one mole of bromine to form 5,6-dibromopregnane-3β, 16α,17α-triol-20-one using a methylene chloride-pyridine solvent system usually at room temperature. The dibromide is recovered by crystallization induced by adding water if desired. The product which is a mixture of isomeric dibromides is recovered by filtration, washing then air drying.

The dibromide is then brominated at C-21 with about one mole of bromine using an acid catalyst such as hydrogen chloride usually in methylene chloride-methanol. Bicarbonate is used to neutralize the reaction and separate the desired tribromide.

We have also unexpectedly found that acyloxy substituents at C-16 cannot be used in this reaction because of the difficulty of hydrolysis of these compounds to obtain the desired 16-hydroxy compounds requires such strongly basic conditions that extensive D-homoannulation of the D ring occurs. If triamcinolone or its congeners are being prepared, however, such compounds may be used since the commercial form is the 16,21-diacetate.

Other solvents for these reactions can be used such as chloroform-methanol, ethylene dichloride, dioxane, etc. The reactions are most conveniently carried out at about room temperature.

The mother liquors from either of these reactions described above are worked up by debromination, usually using zinc-acetic acid (Organic Synthesis IV, 195) or chromous chloride (U.S. Patent No. 2,374,683) to yield triolone which can be recycled.

The tribromo compound (II) is then reacted with from about 2–3 moles of an alkali metal iodide preferably sodium or potassium iodide in a suitable solvent such as methanol at moderate temperatures such as from about room temperature to about 35–40° C. The 21-halo-$\Delta^{5,6}$-compound can be separated at this point then reacted at C-21 with an alkali metal lower carboxylate at reflux in acetone. The 21-halo group is mostly iodo contaminated with some bromo compound. The reaction can alternatively be run without isolation of this intermediate. We have found that the reaction at C-21 will not proceed as the 16,17-acetonide presumably because of steric hindrance but must be run on the diol. Compound III is described by Ringold et al., Bull. soc. chim. Belges, 70, 271 (1961).

The acetonide (IV) is formed by standard means such as either reaction with acetone-iodine at reflux or acetone-perchloric acid at room temperature (also see U.S. Patent No. 3,048,581). This compound is then oxidized by the modified Jones reaction as described in our copending application, Serial No. 286,959, now U.S. Patent No. 3,187,025, granted June 1, 1965. IV is brominated at C-5,6 using about one mole of bromine usually in methylene chloride-pyridine, then oxidized with Jones reagent in acetone at below room temperature, debrominated using standard conditions usually zinc dust and acetic acid, isomerized completely under acid conditions such as in dilute hydrochloric acid to give the desired 4-pregnene-16α,17α,21 - triol - 3,20 - dione - 21 - acetate 16,17 - acetonide. Some isomerization of the 5,6-unsaturated bond to 4,5 occurs during debromination.

This compound is converted into an active glucocorticoid compound useful in various dermatoses by introducing an 11-hydroxy group by standard fermentation using a standard *Aspergillus niger* inoculum (U.S. Patent No. 2,855,410).

It will be recognized by those skilled in the art that the reactions outlined above can also be carried out using the known 16-acetate derivative of 5-pregnene-3β-16α,17α-triol-20-one to obtain the 16,21-diacetate derivatives of 4-pregnene-16a,17a,21-triol-3,20-dione and 4-pregnene- 11α, 16α, 17α, 21-tetrol-3,20-dione which are analogues of triamcinolone having glucocorticoid activity.

The term "alkali metal" used herein is meant to have the usual art recognized meaning but with sodium or potassium preferred. "Lower carboxylate" means having a maximum of 6 carbon atoms. "Acylate" means acyl groups derived from carboxylic acid of a maximum of 8 carbon atoms, preferably acetate. The Jones reagent comprises chromic acid (or anhydride) in aqueous sulfuric acid [see Bowden et al., J. Chem. Soc. (1946), 39]. Other acetal or ketal derivatives may be formed at the 16, 17-dihydroxy groups as described in U.S. Patent No. 3,048,581.

It will be apparent to those skilled in the art that certain steps in the reaction sequence claimed can be modified without departing from the nub of this invention as described herein, for example, using various acylate derivatives such as the 3-formyl or acetate, inserting nonreactive or "inert" substituents in other positions of the A, B or C rings, such as a 9α-fluoro, 6-fluoro or 6-methyl group (see U.S. Patent No. 3,107,240), or changing solvents in individual steps. Such are included in this invention.

*Example 1*

A mixture of 35 g. of $\Delta^{5,6}$-pregnene-3β,16α,17α-triol-20-one (M.P. 242–246° C.) in 350 ml. of methylene chloride and 9 ml. of pyridine is stirred while 16.8 g. of bromine in 35 ml. of methylene chloride is slowly added. Methanol (15 ml.) is added and stirring is continued for one-half hour. Two milliliters of another equivalent portion of bromine solution is added, then enough hydrogen chloride gas to neutralize the pyridine and initiate bromination at C-21. When the mixture decolorizes the rest of the bromine solution is added as rapidly as it is consumed. Methanol (20 ml.) is added while stirring followed by a solution of 21 g. of sodium bicarbonate in 350 ml. of water. Upon stirring the 5α,6β,21-tribromopregnane-3β,16α,17α-triol-20-one separates, 35–40 g., M.P. 120–130° C. α/D=—29 (dioxane).

The methylene chloride filtrate is separated from above, mixed with 18 ml. of acetic acid and 70 ml. of methanol then with zinc dust. After stirring and refluxing for 15 minutes 12 g. of recovered triol starting material is recovered.

Sodium iodide (8 g.) is added to a suspension of 15.3 g. of the tribromide in 75 ml. of methanol. The mixture is stirred at 35–40° C. for two hours. Dilution with 50 ml. of water and 75 ml. of methylene chloride is followed by shaking with a solution of 7.5 g. of sodium thiosulfate in 15 ml. of water. The organic layer is separated and combined with methylene chloride extracts of the aqueous layer then washed with 50 ml. of warm water. The organic layer is quickly separated, concentrated and cooled to separate 7.5–8.0 g. of 21-bromo-5-pregnene-3β,16α,17α-triol-20-one, M.P. 125–130° C. α/D=—12 (dioxane).

Three grams of 16α-hydroxypregnenolone is recovered from treating the filtrate with zinc dust, methanol and acetic acid.

A mixture of 12 g. of 21-bromo compound, 18 g. of potassium acetate and 100 ml. of acetone is stirred and refluxed for four hours. Most of the acetone is distilled off. The product is watered out to give 10.5 g. of 5-pregnene-3β,16α,17α,21-tetrol-20-one 21-acetate (16α-hydroxymonac, M.P. 186–188° C.) α/D=—30 (chloroform).

A mixture of 10 g. of 16α-hydroxymonac, 200 mg. of iodine and 50 ml. of acetone is heated at reflux for one-half hour, concentrated and diluted with 50 ml. of water. An aqueous solution of 500 mg. of sodium thiosulfate is added. Dilution to 150 ml. with water gives 10.5 g. of the 16,17-acetonide of 16α-hydroxymonac, M.P. 213–215° C., α/D=—11 (chloroform).

A mixture of 8 g. of acetonide and 4 ml. of pyridine in 50 ml. of methylene chloride is cooled to 0–5° C. A solution of 3.4 g. of bromine in 10 ml. of methylene chloride is added plus 100 ml. of acetone. At 0–5° C. a solution of 3.1 g. of chromic acid, 5 ml. of water and 2.7 ml. of sulfuric acid is added rapidly below room temperature. After stirring for one-half hour methylene chloride (60 ml.) is added then 140 ml. of water. The organic layer is separated and debrominated with 25 ml. of methanol, 4 ml. of acetic acid and 2.8 g. of zinc dust. Hydrochloric acid is added and the solution allowed to stand with stirring briefly. Water (150 ml.) is added. The organic layer is separated, washed with dilute alkali then water. The organic solution is concentrated, diluted with acetone and reconcentrated. Cooling gives the 16,17-acetonide of 4-pregnene-16α,17α,21-triol-3,20-dione 21 acetate.

*Example 2*

One kilogram of triolone is dissolved in 8 l. of methylene chloride and 200 ml. of pyridine. A solution of 465 g. of bromine in 500 ml. of methylene chloride is added over a 5–10 minute period. After stirring for 5 minutes, 300 ml. of methanol is added. About 3 l. of water is added gradually to separate 1250 g. of 5,6-dibromopregnane-3β,16α,17α-triol-20-one, M.P. 115–118° C. (dec.); α/D=—54 (dioxane).

The organic portion of the filtrate is separate and mixed with 330 ml. of acetic acid, 1000 ml. of methanol and 125 g. of zinc dust. After refluxing and separating the zinc, 140–145 g. of triolone is recovered.

The dibromide (1250 g.) in 6.25 l. of methylene chloride is stirred while 5% of a bromine solution having 415 g. of bromine and 600 ml. of methylene chloride is added at about 23–25° C. Methanol (315 ml.) is added followed by hydrogen chloride gas which induces a temperature rise to 30–35° C. The remainder of the bromine solution is added rapidly (5–10 minutes). Methanol (315 ml.) is added cautiously followed by a solution of 415 g. of sodium bicarbonate in 4 l. of water. After stirring the precipitate is separated and air dried to give the tribromide, M.P. 125–130° C. (dec.); α/D=—33 (dioxane) 1150 g. The mother liquor is debrominated with zinc as above to give 130 g. of triolone.

The tribromide (1150 g.) in 3.4 l. of methanol with 17.5 g. of potassium acetate and 920 g. of sodium iodide is stirred for two hours. Water (3.4 l.) is added with a solution of 920 g. of sodium thiosulfate in 2.3 l. of water. Dilution with 8 l. of water separates the 21-halo mixture (21-iodo plus 21-bromo), 140° C. (dec.), 840–850 g.

A slurry of 840 g. of the 21-halo mixture in 7 l. of acetone is mixed with 1280 g. of potassium acetate then heated at reflux for three hours with stirring. The acetone is largely recovered by concentration to leave a thick slurry which is warmed and stirred under 8.4 l. of water removing any residual acetone in vacuo. Cooling to 30° C. and filtering give a cake which is again washed with water to give 690 g. of 5-pregnene-3β,16α,17α,21-tetrol-20-one 21-acetate, 16α-hydroxymonac, 690 g. M.P. 180–190° C. Purification by slurrying with methanol gives material melting at 195–205° C.

What is claimed is:
1. The method of preparing 4-pregnene-16α,17α,21-triol-3,20-dione 21-acetate 16,17-acetonide comprising:
   (1) reacting 5-pregnene-3β,16α,17α-triol-20-one with about 2 moles of bromine to form a mixture of 5,6, 21-tribromopregnane-3β,16α,17α-triol-20-ones,
   (2) reacting said tribromopregnanetriolone with from about 2–3 moles of an alkali metal iodide to form 21-iodo-5-pregnene-3β,16α,17α-triol-20-one,
   (3) reacting said 21-iodopregnenetriolone with an alkali metal acetate to form 5-pregnene-3β,16α,17α, 21-tetrol-20-one 21-acetate,
   (4) reacting said pregnenetetrolone acetate with an excess of acetone in the presence of a member selected from the group consisting of iodine and perchloric acid to form the 16,17-acetonide,

(5) reacting said acetonide with about one mole of bromine to form the 5,6-dibromide, (6) oxidizing said dibromide with Jones reagent at below about room temperature to give 5,6-dibromo-pregnane-16α,17α,21-triol-3,20-dione 16,17-acetonide 21-acetate, (7) reacting said dibromopregnanetrioldione with zinc-acid to give 5-pregnene-16α,17α,21-triol-3,20-dione 16,17-acetonide 21-acetate, and (8) isomerization of said pregnenetrioldione under acid conditions to complete the formation of 4-pregnene-16α,17α,21-triol-3,20-dione 21-acetate 16,17-acetonide.

2. 2-iodo-5-pregnene-3β,16α,17α-triol-20-one.
3. 5,6,21-tribromo-pregnane-3β,16α,17α-triol-20-one.
4. 5α,6β,21-tribromo-pregnane-3β,16α,17α-triol-20-one.
5. 5,6-dibromo-pregnane-3β,16α,17α-triol-20-one.

6. The method of forming 5,6,21-tribromo-pregnane-3β,16α,17α-triol-20-one comprising:

(1) reacting 5-pregnene-3β,16α,17α-triol-20-one with about one mole of bromine to form 5,6-dibromo-pregnane-3β,16α,17α-triol-20-one, and (2) reacting said dibromopregnanetriolone with about one mole of bromine in the presence of hydrogen chloride.

7. A compound of the structure:

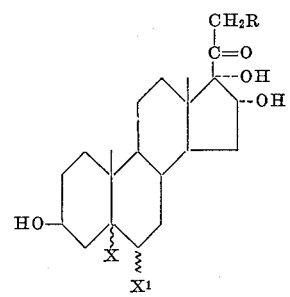

in which

X and X' are members selected from the group consisting of bromine or when taken together with the carbon atoms to which they are attached, vinylene; and R is a member selected from the group consisting of hydrogen and bromine, at least R being bromo or X and X¹ being both bromo.

References Cited by the Examiner
UNITED STATES PATENTS
3,187,025  6/1965  Julian et al. _____ 260—397.47

LEWIS GOTTS, *Primary Examiner.*

ELBERT L. ROBERTS, *Examiner.*